United States Patent
Gruber (10) Patent No.: US 12,542,691 B2
(45) Date of Patent: Feb. 3, 2026

(54) METHOD AND APPARATUS FOR AUTHORIZING CHANGES TO A LOCAL NETWORK CONTROL DEVICE

(71) Applicant: Universal Electronics Inc., Scottsdale, AZ (US)

(72) Inventor: Brandon Gruber, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 424 days.

(21) Appl. No.: 18/163,325

(22) Filed: Feb. 2, 2023

(65) Prior Publication Data

US 2024/0267252 A1 Aug. 8, 2024

(51) Int. Cl.
*H04L 12/28* (2006.01)

(52) U.S. Cl.
CPC ........ *H04L 12/2898* (2013.01); *H04L 12/287* (2013.01)

(58) Field of Classification Search
None
See application file for complete search history.

(56) References Cited

U.S. PATENT DOCUMENTS

| | | | |
|---|---|---|---|
| 7,948,925 B2 | 5/2011 | Miyabayashi | |
| 8,261,322 B2 * | 9/2012 | Larsen | H04L 63/08 726/3 |
| 9,918,351 B2 * | 3/2018 | Kim | H04L 67/141 |
| 9,992,032 B2 * | 6/2018 | Patil | H04L 41/0809 |
| 10,204,073 B2 * | 2/2019 | Chan | H04L 41/0806 |
| 10,419,907 B2 * | 9/2019 | Redding | H04W 4/80 |
| 10,444,715 B2 * | 10/2019 | Plummer | G05B 15/02 |
| 10,492,102 B2 * | 11/2019 | Raleigh | H04W 28/02 |
| 10,560,975 B2 * | 2/2020 | Kim | H04W 48/08 |
| 10,593,174 B1 * | 3/2020 | Yoon | H04L 12/2816 |
| 10,677,484 B2 * | 6/2020 | Ribbich | F24F 11/47 |
| 10,776,103 B2 * | 9/2020 | Gordon | G06F 1/1626 |
| 10,846,960 B1 * | 11/2020 | Lemberger | G06V 20/63 |
| 11,012,334 B2 * | 5/2021 | Kim | H04L 41/0631 |
| 11,316,688 B2 * | 4/2022 | Ansari | H04M 15/44 |
| 11,638,146 B2 * | 4/2023 | Cammarota | H04W 84/12 726/6 |
| 11,641,610 B2 * | 5/2023 | Panje | H04W 40/02 370/329 |
| 11,659,023 B2 * | 5/2023 | Shelton, IV | A61B 34/25 709/227 |

(Continued)

FOREIGN PATENT DOCUMENTS

EP 4060943 A1 * 9/2022 ......... H04L 12/2825
JP 2019530349 A * 10/2019

OTHER PUBLICATIONS

International Search Report and Written Opinion of application No. PCT/US24/14046, dated May 15, 2024, 7 pp.

*Primary Examiner* — Melvin H Pollack
(74) *Attorney, Agent, or Firm* — Greenberg Traurig, LLP (57) ABSTRACT

A control device for authorizing access and modifications to information and settings of the control device. When a user wishes to make a modification to settings of the control device, the user sends a request to access the settings with a user device. The user is authorized to access the settings when the user physically interacts with the control device within a predetermined time before or after sending the request to access the settings.

24 Claims, 4 Drawing Sheets

(56) References Cited

U.S. PATENT DOCUMENTS

| | | | | |
|---|---|---|---|---|
| 11,683,408 | B2* | 6/2023 | Coffman | G06F 3/0488 |
| | | | | 715/717 |
| 11,765,164 | B2* | 9/2023 | Passaglia | H04L 63/083 |
| | | | | 726/5 |
| 11,889,315 | B2* | 1/2024 | Guo | H04W 88/16 |
| 11,909,549 | B2* | 2/2024 | Scalisi | H04L 12/2823 |
| 12,112,606 | B2* | 10/2024 | McRae | H04L 12/2816 |
| 12,155,654 | B2* | 11/2024 | Tan | H04W 12/71 |
| 12,170,948 | B2* | 12/2024 | Liang | H04W 48/02 |
| 12,184,481 | B2* | 12/2024 | Qu | H04W 8/245 |
| 12,185,104 | B2* | 12/2024 | Kamath | H04W 12/06 |
| 12,185,394 | B2* | 12/2024 | Nishikawa | H04W 4/70 |
| 12,213,068 | B2* | 1/2025 | Nakagawa | H04W 88/10 |
| 12,231,898 | B2* | 2/2025 | Bajko | H04W 76/14 |
| 2014/0172947 | A1* | 6/2014 | Ghai | H04L 65/102 |
| | | | | 709/202 |
| 2016/0258202 | A1* | 9/2016 | Scalisi | G07C 9/00857 |
| 2018/0247483 | A1 | 8/2018 | Lindsay | |
| 2019/0097882 | A1* | 3/2019 | Le Merrer | H04W 8/20 |
| 2023/0023974 | A1* | 1/2023 | Scalisi | H04N 23/50 |
| 2023/0239690 | A1* | 7/2023 | Tseng | H04W 12/73 |
| | | | | 455/411 |
| 2023/0262787 | A1* | 8/2023 | Wu | H04W 12/08 |
| | | | | 726/4 |
| 2023/0396461 | A1* | 12/2023 | Hashimoto | G08C 17/02 |
| 2023/0403556 | A1* | 12/2023 | Wiese | H04W 4/80 |
| 2024/0349369 | A1* | 10/2024 | Hui | H04W 40/10 |
| 2025/0056233 | A1* | 2/2025 | Bonnamy | H04W 12/69 |
| 2025/0103187 | A1* | 3/2025 | Fuchs | H04L 12/282 |

* cited by examiner

METHOD AND APPARATUS FOR AUTHORIZING CHANGES TO A LOCAL NETWORK CONTROL DEVICE

BACKGROUND

I. Field of Use

The present application relates to the field of local network security. More specifically, the present application relates to a method and apparatus for authorizing users in local networks to perform certain actions.

II. Description of the Related Art

Local-area networks (LANs) are ubiquitous in modern homes and businesses throughout the world. In the United States alone, it has been estimated that over 86% of US households have broadband Internet (as of 2020). Typically, high-speed Internet is delivered via DSL, fiber or coaxial cable to a modem located inside a home or business. The modem is typically either coupled to a wired and/or a wireless router or contains such a wired and/or wireless router for distribution of Internet service throughout homes and businesses. Wired connections to routers are typically in accordance with an Ethernet protocol, while wireless connections typically utilize some version of IEEE 802, otherwise known as "Wi-Fi". Devices such as mobile phones, computers, televisions, and many other household devices co-located together within a structure may connect to the Internet via a wired or wireless connection provided by the router, and the router, modem and co-located devices may be referred to as a "local-area network".

Routers are a key part of any local-area network, as they control many aspects of the network. For example, routers may broadcast an SSID and require a passcode in order to connect and route Internet traffic to and from the various connected devices in the network and to/from the Internet.

Routers typically allow users to make changes to router settings, such as to modify firewall settings, to assign static IP addresses to certain devices, to modify DHCP settings, to configure port forwarding, and other changes common to router settings. Typically, in order to initially access a router, a user must enter authorization credentials, such as a user-name and password, in order to view certain basic information and settings of a router, such a listing of one or more SSIDs, a listing of connected devices, and one or more statuses of the router and connected devices. In order to modify any router settings, however, routers typically require a second authorization to occur, such as to provide an alpha-numeric code to the router. This code is typically a long, difficult to memorize code. Only after the correct code is entered can router settings be changed.

While the initial credentials to access basic router information may be easily remembered by a user, the secondary credential is often not. Moreover, users who have a casual understanding of routers may become flustered when asked to provide the secondary credential, as they may not know that the code is usually affixed to the bottom of a router. Further, attributes of routers generally cannot even be viewed without providing the second code. This is frustrating, as a user must usually walk over to the router and retrieve the code simply to view the router settings. All of the above adds up to a frustrating user experience.

It would be desirable, then, to overcome the problems of the prior art and make it easier for users to view and modify sensitive and/or critical router information without having to enter a second authorization code.

SUMMARY

The embodiments described herein relate to methods and apparatus for authorizing access to the control device. In one embodiment, a method is described, performed by a control device in a local-area network, comprising receiving a request from a connected device in the local-area network to access modifiable settings of the control device, providing the modifiable settings to the connected device in response to the request, receiving a request from the connected device to modify a first setting of the modifiable settings, after receiving the instruction, determining that a physical interaction with the network control device has occurred and modifying the first setting in response to determining that the physical interaction has occurred.

In another embodiment, another method is described for allowing modifications to the control device, the method performed by a control device in a local-area network, the method comprising, receiving an electronic request from a connected device in the local-area network to access particular settings of the control device, waiting to receive an indication of a physical interaction with the control device, receiving the indication of the physical interaction with the control device and in response to receiving the indication, providing at least some of the particular settings to the connected device.

In yet another embodiment, a control device is described, part of a local-area network, the control device for authorizing access to the control device, comprising a transceiver for sending and receiving information over the local-area network an interface for a user to physically interact with the control device, a memory for storing processor-executable instructions and a processor coupled to the transceiver, the interface and the memory for executing the processor-executable instructions that causes the control device to receive a request from a connected device in the local-area network to access modifiable settings of the control device, provide the modifiable settings to the connected device in response to the request, receive a request from the connected device to modify a first setting of the modifiable settings, after receiving the instruction, determine that a physical interaction with the network control device has occurred and modify the first setting in response to determining that the physical interaction has occurred.

In yet still another embodiment, a control device is described, located in a local-area network, for authorizing access to the control device, comprising, a transceiver for sending and receiving information over the local-area network, an interface for a user to physically interact with the control device, a memory for storing processor-executable instructions and a processor coupled to the transceiver, the interface and the memory for executing the processor-executable instructions that causes the control device to receive an electronic request from a connected device in the local-area network to access particular settings of the control device, wait to receive an indication of a physical interaction with the control device, receive the indication of the physical interaction with the control device and in response to receiving the indication, provide at least some of the particular settings to the connected device.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention relate to methods and apparatus for authorizing access and/or changes to a control device, or a device in communication with a control device, in a local-area network. As used herein, a "control device" comprises an electronic, network-based device that provides access and/or control to another network-based device in a local-area network. Examples include a wired and/or wireless Wi-Fi router, a combination modem/router, a central controller or "hub" that controls a home automation/monitoring system, such as a smart home hub or a security system, a gateway that passes communications between home automation/monitoring components and an associated remote server over the Internet, a thermostat, a home security controller, and the like. The methods and apparatus described herein allow a user to access and make changes to certain modifiable settings of a control device without having to use perform multiple authorizations, or need to provide authorization credentials, such as a username and password. In one embodiment, authorization to access and/or make changes to certain information of a control device relies on the user physically interacting with a control device, such as by pressing a pushbutton on the control device before or after the user submits an electronic request to modify the settings, by being in close proximity to a control device (including, in some embodiments, performing a certain, physical action such as waiving). In another embodiment, authorization to access and/or make changes is granted when a wireless signal from a preauthorized device in the local-area network occurs. Authorization relies a supposition that a request to modify settings is valid if, typically within a predetermined time period before or after a request to modify settings is received, someone physically interacts with the control device, is detected nearby, or sends an authorization signal from a preauthorized device in a local-area network, inferring that a person is authorized to be within a home or business where the control device is located and, therefore, is authorized to make access/make changes.

Figure 1:
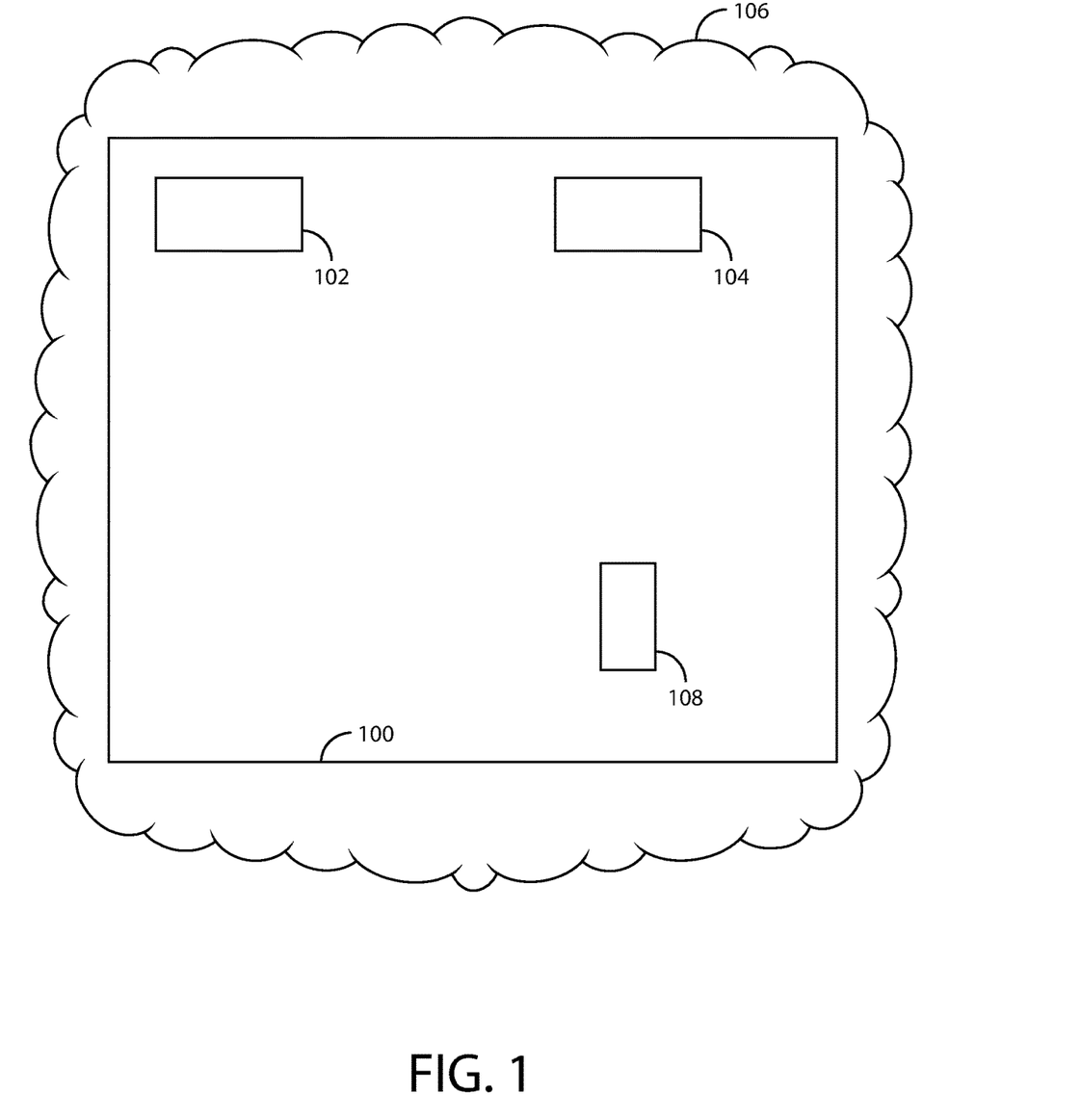
FIG. 1 is simplified block diagram of a structure where a control device is part of a local-area network.

Authorization to access and/or modify information and settings of a control device, or a device coupled to a control device, may be performed at one or more stages of interaction with a control device, as follows:

1. Initial access to a control device
2. Viewing particular information and settings (i.e., in some embodiments, "critical" or "sensitive" information and settings)
3. Modification of particular information and settings FIG. 1 is simplified block diagram of a structure 100, such as a home or business, containing two control devices, a router 102 and a home security controller 104. Structure 100 may have fewer or a greater number of control devices, such as a home automation controller or "hub" for controlling a variety of connected home automation devices, such as smart lights, an HVAC system, a smart sprinkler system, smart outlets, etc. In general, a control device is an electronic device that communicates with other electronic devices or systems at least a local-area network comprising at least some information and settings that may be modifiable by a user. For example, router 102 is a control device that routes communications from various network-capable devices within a local-area network defined by router 102, sometimes between the devices and sometimes to remote devices via the Internet. Home security controller 104 is a control device that communicates with a number of security sensors (not shown) that monitor doors and windows of structure 100. In one embodiment, communications with a control device are performed directly, such as in the case where a control device utilizes direct communication technology, such as Bluetooth, or in a special case where control device comprises router 102, where Wi-Fi communications with router 102 allow for direct communication with router 102. In other embodiments, communication with a control device occurs indirectly, such as where communications to a control device are routed through router 102.

Router 102 is typically a wireless router that connects network-capable devices in and around structure 100 with a wide-area network, such as the Internet. Such routers are widely used in homes and businesses around the world, and typically utilize some version of the well-known IEEE 802 WiFi protocol. Shown in FIG. 1 is the wireless coverage boundary 106 of a local-area network formed by router 102, where any network-capable devices within coverage boundary 106 are able to communicate wirelessly with router 102. Boundary 106 may cover a portion or all of the interior space of structure 100 and often additionally covers some space outside of structure 100, as shown. The coverage area may be referred to herein as a "local-area network".

User device 108 allows a user of user device 108 to communicate with one or more control devices inside structure 100 when user device 108 is within boundary 106 via router 102. User device 108 may be referred to herein as a "connected device" when it is connected to a local-area network. In another embodiment, user device 108 may communicate with one or more control devices directly, such as by a direct communication technology such as one or more versions of the well-known Bluetooth technology.

User device 108 may comprise a smart phone, tablet computer, desktop or laptop computer, a wearable device such as a smart watch, or some other electronic network-capable device that can communicate with router 102. User device 108 may execute a software application or "app" used to communicate with a control device, or communications may be effectuated without the use of an app, such as in the case of user device 108 accessing a web page that provides an interface to a control device.

In any case, a user of user device 108 may wish, from time to time, to view and/or modify certain information, settings, parameters or other data stored by a control device. For example, if a control device is router 102, the user may wish to change an SSID, change a password associated with an SSID, add or modify port forwarding settings, etc. If a control device is home security controller 104, the user may wish to modify an entry code or modify settings of one or more security sensors. If a control device is a thermostat, the user may wish to add or modify time and temperature setpoints.

Often times, when a user wishes to access a control device in order to view and/or modify settings, the user must first provide login credentials to the control device for initial authorization in order to view and/or modify some, but not all, settings of the control device. Typically, the login credentials comprise a username and password. Once the initial authorization in complete, a user of user device 108 may be allowed to view and/or modify certain, information and settings of the control device but not be allowed to view and/or modify other settings that may be, for example, sensitive, important or critical to operation of the control device or a connected device, such as firewall settings, port forwarding settings, passwords, settings relating to a home security system such as adding/deleting security sensors, naming the sensors, etc. In order to view and/or modify sensitive and/or critical settings of the control device, a second authorization may be required. In the prior art, such second authorization typically requires a user to enter a password that allows an already-authorized user access to the sensitive/critical settings of the control device. For example, many consumer wireless routers have a long, complex password printed or affixed on the router itself for allowing access to sensitive/critical settings. The complex nature of these passwords makes them difficult to memorize, making access to sensitive/critical settings cumbersome and frustrating, as users often do not remember or know that the password is printed/affixed to the router. Embodiments of the present invention, however, utilize a different way to authorize review and/or modifications to sensitive/critical settings. When a user wishes to review and/or modify sensitive/critical settings, the user physically interacts with a control device, approaches a control device or provides a wireless authorization signal from a preauthorized device in the local-area network. After the user physically interacts with the control device, or otherwise authorizes him/her self to a control device, the user is able to review and/or modify sensitive/critical settings.

Physical interaction with a control device may comprise a user manipulating a mechanical means on a control device, such as a pushbutton, toggle switch, touchscreen, or some other device located on a control device. In another embodiment, physical interaction may comprise entering biometric information to a control device, such as touching a fingerprint reader, using an internal scanner to scan a retina of the user, facial recognition using a camera of a control device, etc. In another embodiment, physical interaction with a control device may comprise simply approaching a control device within a predetermined distance, such as 3 feet, or performing a predefined action within view of a camera of a control device, such as waiving to the camera. In another embodiment, authorization to access/modify certain settings and information may comprise sending a wireless signal to a control device by another user device within the same local-area network as the control device, such as user device 110, where the control device provides authorization when the wireless signal originates from a preauthorized user device, as stored in a memory of the control device. Using any of the aforementioned techniques, physical location of the user can be verified to be withing a predetermined distance from a control device, such as 10-100 feet, because being physically near a control device may imply that a user who wishes to access/modify certain information and settings of a control device is inside structure 100 and, therefore, authorized to access/modify the settings.

In the embodiment where a second user device 110 is used to authorize access/modification to certain information and settings of a control device, the user may cause a wireless authorization signal to be transmitted from user device 110 within boundary 106, such as a wearable device, smartwatch, keyfob or any electronic device other than user device 108, preauthorized to allow a user to access and/or modify sensitive/critical information and settings of a control device or devices coupled to a control device. In this embodiment, user device 110 is preregistered with a control device as being an "authorized device" to authorize access and/or modification to the control device and/or devices coupled to the control device. In some embodiments, a control device will additionally check to see if user device 110 is also within boundary 106, i.e., part of the local-area network by, for example, checking for an IP address assigned by router 102. A control device may perform an initialization process with device 110 that stores an identification of user device 110 in a memory of the control device. The identification information may comprise a MAC address of user device 110, a serial number of user device 110, a local IP address, or some other identifier. Then, later, user device 110 can be used to authorize access/modifications to a control device after a user requests access/modification in a separate request using user device 108.

After the user has physically interacted with a control device, comes in close physical proximity to a control device or transmits a wireless authorization signal from a device other than user device 108, typically within a predetermined time, such as between 30 seconds and one or more minutes, the control device may provide access to the sensitive/critical settings of the control device (or to another device in communication with the control device, such as a security sensor, HVAC equipment, IoT devices, etc.).

Figure 2:
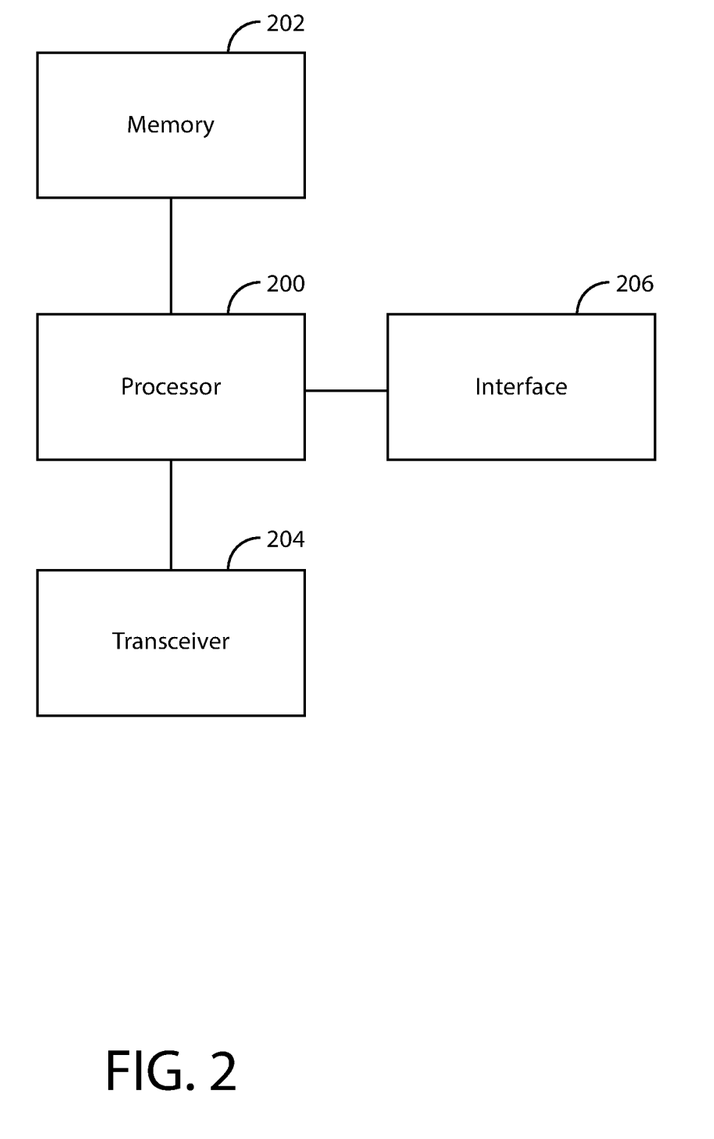
FIG. 2 is a simplified, functional block diagram of one embodiment of the control device shown in FIG. 1.

FIG. 2 is a simplified, functional block diagram of one embodiment of a control device, comprising processor 200, memory 202, transceiver 204 and interface 206. It should be understood that the functional blocks may be coupled to one another in a variety of ways, and that not all functional blocks necessary for operation of a control device (such as a power supply), for purposes of clarity.

Processor 200 controls general operations of the control device by executing processor-executable instructions stored in memory 202, for example, executable code. Processor 200 may comprise one or more general or specific-purpose microprocessors, microcomputers, microcontrollers and/or ASICs. In the case of general-purpose processor, the general-purpose processor becomes a specialized processor when memory 202 is loaded with processor-executable instructions or when processor 200 executes the processor-executable instructions. Generally, processor 200 is selected based on factors such as computational power and cost.

Memory 202 is coupled to processor 200 and comprises one or more information storage devices, such as RAM, ROM, flash, or other type of electronic, optical, or mechanical memory device. Memory 202 is used to store processor-executable instructions for operation of the control device, as well as any information used by processor 200, such parameters and settings of the control device or one or more network-capable devices under control of the control device. In some embodiments, some or all of memory 202 is incorporated into processor 200.

Transceiver 204 is coupled to processor 200 and comprises circuitry necessary to wirelessly communicate with network-capable devices in range of the control device (i.e., within boundary 106). In one embodiment, transceiver 204 comprises a Wi-Fi transceiver. In another embodiment, transceiver 204 comprises a Bluetooth transceiver. In other embodiments, transceiver 204 comprises circuitry that enables the control device to communicate with other devices using two or more communication technologies. For example, transceiver 204 could comprise WiFi communication circuitry to communicate with user device 108 and Bluetooth or NFC technology to communicate with user device 110.

Interface 206 is mechanically mounted to a chassis or housing of the control device and electronically coupled to processor 200. Interface 206 comprises a device for determining when a person physically interacts with the control device or is physically proximate to the control device. In one embodiment, interface 206 comprises a pushbutton, toggle switch, touchscreen, or some other device located on the control device that generates an electrical signal indicating that interface 206 has been physically manipulated. In another embodiment, interface 206 may comprise a biometric reader, such as a fingerprint reader for determining when a user places a finger on the fingerprint reader. In another embodiment, interface 206 comprises a device that determines that a person is in close proximity to the control device, such as a retinal scanner for scanning an eye of a person near the control device, or a camera using, for example, facial recognition technology to identify either a particular person authorized to access/modify sensitive/critical information and settings, to identify that any person is in close proximity to the control device (which assumes that if any person is detected near the control device, especially within a short time of receiving a request to access/modify sensitive/critical information and settings, the user who sent the request is the same person as the one detected by the camera) or to detect a predetermined gesture provided by a person in view of the camera. In yet another embodiment, interface 206 may comprise a microphone and associated amplification and/or filtering circuitry for listening for a human voice. In general, interface 206 comprises any device that may alert processor 200 to the presence of a person at or near the control device.

Figure 3A:
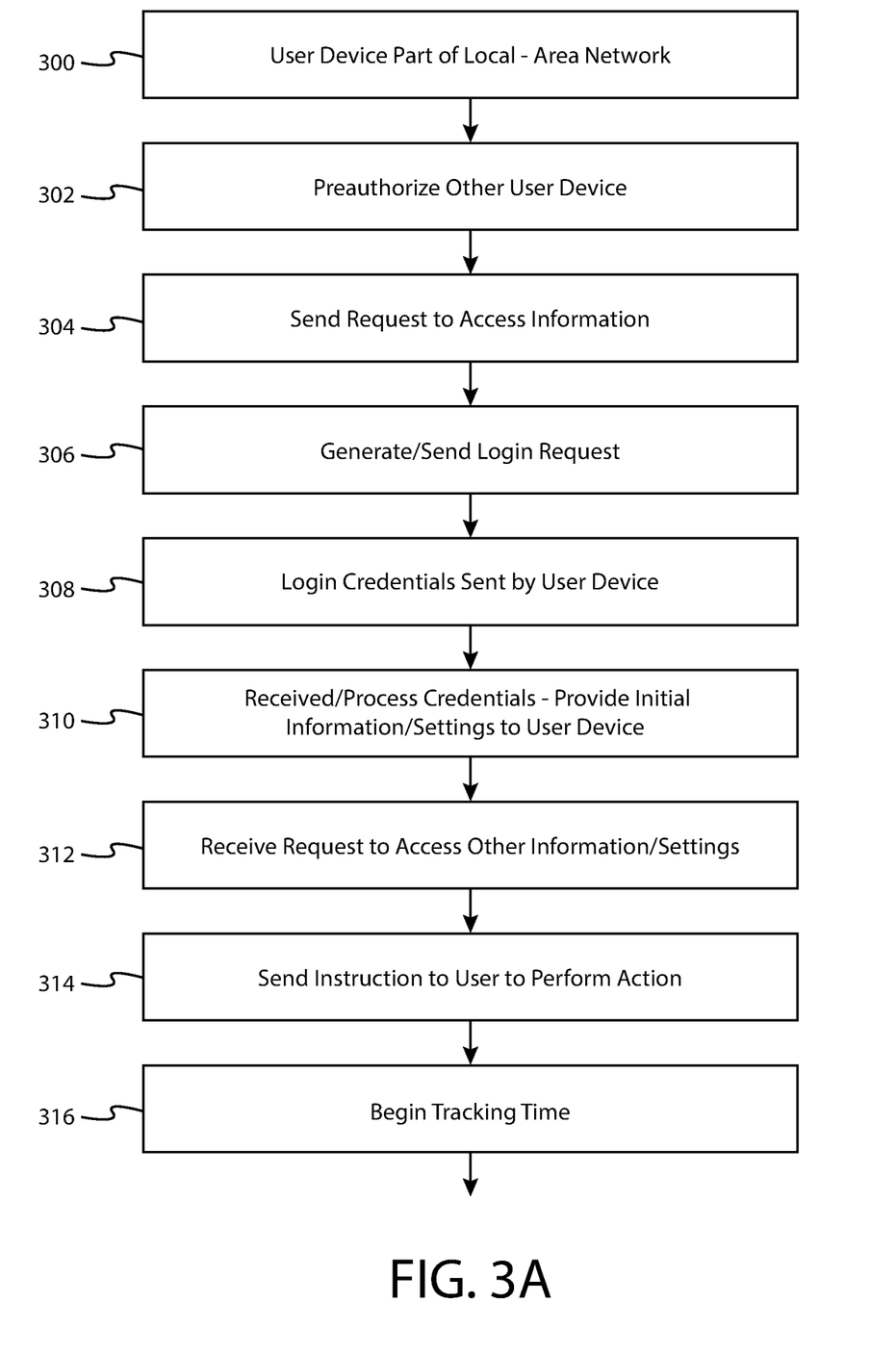
FIGS. 3A-3B are a flow diagram illustrating one embodiment of a method performed by the control device shown in FIGS. 1 and 2, for authorizing access and/or modifications to sensitive/critical settings of the control device and/or one or more connected network-capable devices.
Figure 3B:
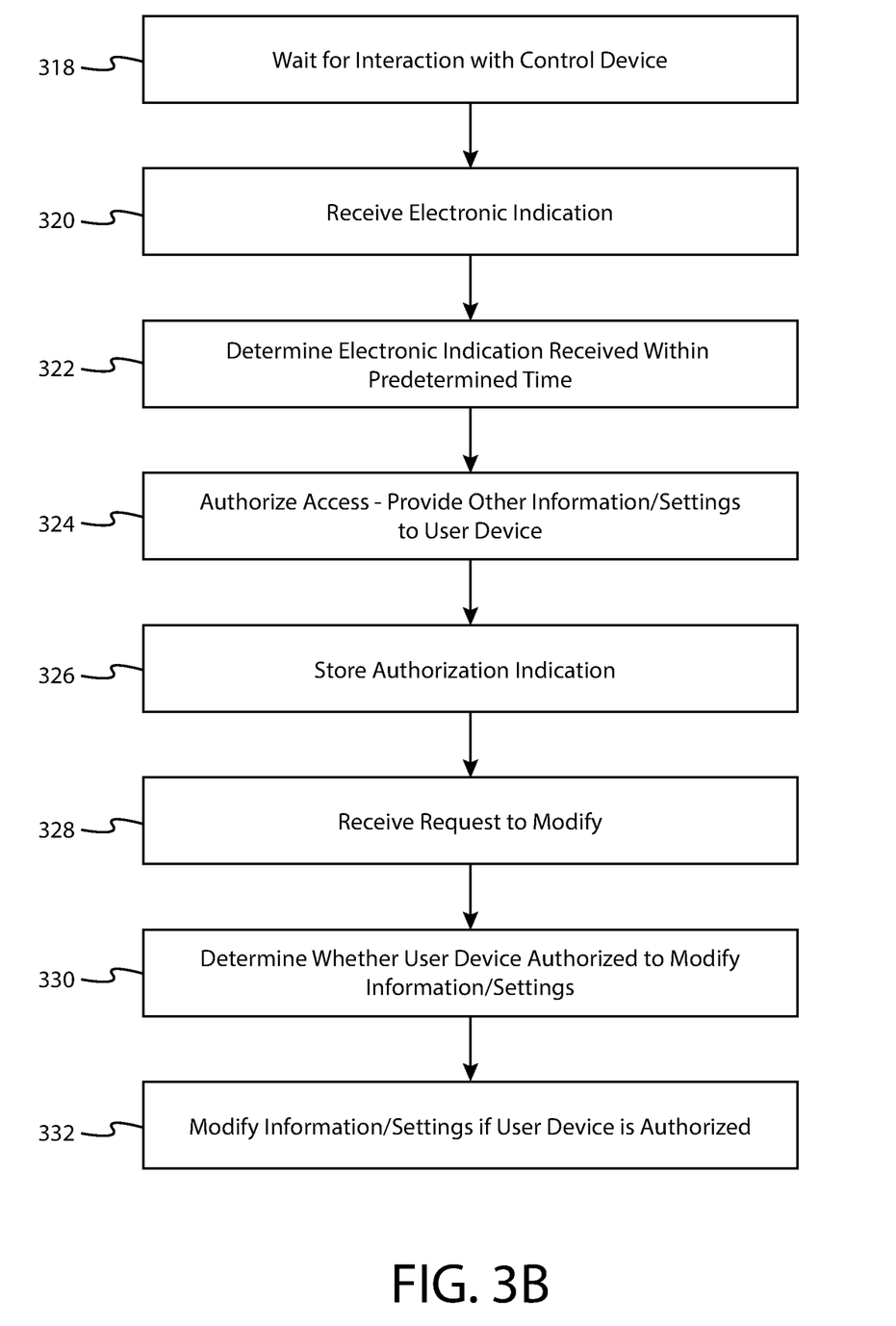

FIGS. 3A-3B represent a flow diagram illustrating one embodiment of a method performed by a control device for authorizing review and/or modifications to certain information and settings of the control device and/or one or more connected network-capable devices. It should be understood that although the method is described in terms of control device comprising home security controller 104 accessed through router 102, the concepts described with respect to the method could be used with other types of control devices and using direct means of communication (such as Bluetooth), rather than indirect communications through router 102. It should be understood that in some embodiments, not all of the steps shown in FIG. 3 are performed, and that the order in which the steps are carried out may be different in other embodiments.

At block 300, a user of user device 108 has already joined a local-area network formed by router 102, as well-known in the art, typically using a username and password to join the local-area network.

At block 302, in one embodiment, a user may preauthorize user device 110 with the home security controller 104. In general, in this embodiment, the user causes user device 110 to send a wireless signal to home security controller 104, where home security controller 104 may be placed into a "learn" mode of operation during this time. When home security controller 104 receives the wireless signal from user device 110, it stores one or more attributes of user device 110, such as a serial number of user device 100, a MAC ID, an IP address, or some other attribute that uniquely identifies user device 110. Processor 200 of home security controller 104 stores this information in memory 202 for later access to certain information stored in memory 202.

At block 304, user device 108 sends a request to home security controller 104 via router 102 for user device 108 to initially access at least a portion of information and settings stored in memory 202 by home security controller 104, for example, one or more web pages comprising the general information and settings pertaining to home security controller 104.

At block 306, home security controller 104 may require the user to provide login credentials in order to access the information and settings, typically in the form of a username and password that is recognized by home security controller 104. Processor 200 generates a request for the user to enter the login credentials and sends the request to user device 108.

At block 308, the user may enter the login credentials and send them to home security controller 104 via router 102.

At block 310, the login credentials are received by home security controller 104 and, in response, processor 200 of home security controller 104 processes the login credentials and, if the credentials match what is stored in memory 202, processor 200 sends a portion of the information and settings to user device 108 via router 102. The information and settings may comprise a listing of all of the security sensors associated with home security controller 104 and a current status, for example. Typically, the information and settings are not modifiable.

At block 312, subsequently, processor 200 of home security controller 104 may receive a request to access other information and settings stored by memory 202 of home security controller 104, different that the information and settings provided by home security controller 104 previously. In some embodiments, the other information and settings comprise sensitive/critical information and settings pertaining to home security controller 104 or one or more home security sensors associated with home security controller 104. In some embodiments, the other information and settings are modifiable by the user. Such other information and settings may comprise, for example, zone information, delay times, an ability to add/remove paired security sensors, an ability to enable/disable functions of the security system, changing metadata of one or more security sensors, such as a sensor name or sensor settings, etc.

In one embodiment, once processor 200 has received the request to access the other information and settings, processor 200 may ignore other similar requests made by any other device in the local-area network until either a predetermined amount of time has elapsed from receiving the request (described below), until physical interaction with, or proximity to, a control device occurs, or upon receipt of an authorization signal from a preauthorized device in the local-area network. It should be understood, throughout this disclosure, that reference to timing from a particular event, such as receipt of the request to access other information and settings, could be referenced from a different event occurring at a slightly different time. For example, processor 200 may, instead, ignore requests to access the other information and settings from another device in the local-area network until a predetermined amount of time has elapsed since sending a message to a user device with instructions to perform an authorization activity (described below).

At block 314, processor 200 may send a message to user device 108, instructing the user to perform a particular action in order to view and/or modify the other information and/or settings. For example, the message may comprise a text message, an in-app message, an audible instruction, etc., that tells the user to perform the action. The action may comprise pressing a pushbutton located on home security controller 104, positioning a switch located on home security controller 104, gesturing in a certain way, such as "wave your hand three times in the air", approach home security controller 104 within a predetermined distance, such as 1 foot, touching a fingerprint reader, scanning a retina, transmit a wireless authorization message from user device 110 with an identification of user device 110 (i.e., FOB, wearable device, etc.), bring an RFID FOB near security system controller 104, or some other action proximate to home security controller 104 that lets processor 200 know that the user who requested the other information and settings is physically near home security controller 104.

At block 316, after processor 200 receives the request to access the other information and/or settings, or after sending the message in block 314, processor 200 may begin tracking an elapsed time from either incident, for example, by starting a software countdown timer or starting a clock.

At block 318, after processor 200 has sent the message in block 314, processor 200 waits for a physical interaction with, or a detection of proximity to, or receipt of an authorization signal by home security controller 104.

At block 320, processor 200 may receive an electronic indication from interface 206 that a user has physically interacted with home security controller 104, or that a person was detected in close physical proximity to home security controller 104, sometimes performing a particular action. Interface 206 generates the electronic indication when a user manipulates interface 206, such as by pushing a pushbutton when interface 206 comprises a pushbutton, or by pressing a switch when interface 206 comprises a switch. In another embodiment, when interface 206 comprises a biometric reader, the electronic indication is generated by interface 206 when a human fingerprint, retina or other physical characteristic of a human is detected. In one embodiment where interface 206 comprises a microphone and related amplification and/or filtering circuitry, the electronic indication may comprise signals generated by the microphone in response to ambient noise proximate to home security controller 104, wherein processor 200 may process the signals and determine when the signals represent a human voice speaking in proximity to home security controller 104. In one embodiment, a human voice speaking in proximity to home security controller 104 is determined when a volume level indicated by the signals exceeds a predetermined threshold, i.e., a user speaks to home security controller 104 in a relatively loud voice within a few feet of home security controller 104. In another embodiment, processor 200 determines when a predetermined "wake word" is uttered by a person in proximity to home security controller 104. In an embodiment where interface 206 comprises a camera, the electronic indication may comprise digital still or video images, wherein processor 200 processes the signals to determine if a human is in proximity to home security controller 104. In a related embodiment, processor 200 may utilize facial recognition technology to recognize one or more predetermined users who are authorized to access/modify sensitive/critical information and settings. In yet another embodiment, indicator 206 may comprise an RFID reader for determining when a FOB having an authorized RFID chip is proximate to security system controller 104.

At block 322, after processor 200 has received the electronic indication from interface 206, or when processor 200 has determined that a person, or a particular, preauthorized person is in physical proximity to home security controller 104, or when processor 200 has received a wireless authorization signal from user device 110, processor 200 may determine whether the electronic indication, or the determination, or the wireless authorization signal has occurred within a predetermined time from when the request to access/modify the other information and settings was received, or from when processor 200 sent the message to user device 108. In one embodiment, processor 200 checks a software timer that was started. In another embodiment, processor 200 checks an elapsed time that is being tracked and compares the elapsed time to a predetermined time stored in memory 202, such as a time between 30 seconds and one or more minutes.

At block 324, if the indication was received within the predetermined time, processor 200 authorizes the request to access the other information and settings and provides the other information and settings to user device 108, in some embodiments, in the form of one or more web pages.

At block 326, if the request to access the other information and settings is authorized, processor 200 may store a flag or some other indication in memory 202 indicating that user device 108 is authorized to view and/or modify the other information and/or settings. The indication may automatically be deleted after a predetermined time period, such as 30 minutes.

At block 328, after processor 200 has provided the other information and settings to user device 108, processor 200 may receive a request to modify one or more of the sensitive/critical settings from user device 108.

At block 330, processor 200 determines whether or not user device 108 is authorized to modify the other information and/or settings by checking memory 202 for the indication that user device 108 was previously authorized to view and/or modify the other information and/or settings.

At block 332, when user device 108 is determined by processor 200 to be authorized to modify the one or more settings, processor 200 modifies the one or more settings as directed in the request received at block 328.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method performed by a control device in a local-area network for authorizing access to the control device, comprising:
   receiving a request from a user device in the local-area network to access modifiable settings of the control device;
   providing the modifiable settings to the user device in response to the request;
   receiving a second request from the user device to modify a first setting of the modifiable settings;
   after receiving the second request, determining that a physical interaction with the control device has occurred; and
   modifying the first setting in response to determining that the physical interaction has occurred.

2. The method of claim 1, wherein the control device comprises a router.

3. The method of claim 1, wherein the control device comprises a home security controller.

4. The method of claim 1, wherein determining that a physical interaction with the control device has occurred comprises:
   determining that a pushbutton has been pressed on the control device.

5. The method of claim 4, wherein determining that a physical interaction with the control device has occurred comprises:
   determining that the pushbutton has been pressed on the control device within a predetermined time from when the second request was received.

6. The method of claim 1, further comprising:
   authorizing a user of the user device to access a portion of the control device prior to receiving the second request.

7. A method, performed by a control device in a local-area network, for allowing modifications to the control device, the method comprising:
   receiving an electronic request from a user device in the local-area network to access particular settings of the control device;
   waiting to receive an indication of a physical interaction with the control device;
   receiving the indication of the physical interaction with the control device; and
   in response to receiving the indication, providing at least some of the particular settings to the user device.

8. The method of claim 7, wherein providing at least some of the particular settings to the user device comprises:
   providing the at least some of the particular settings to the user device only when the indication is received within a predetermined time from when the electronic request was received.

9. The method of claim 7, wherein the indication comprises an electronic signal generated when a user activates a switch on the control device.

10. The method of claim 7, further comprising:
    after receiving the electronic request is received, providing a message to the user device for a user of the user device to physically interact with the control device.

11. The method of claim 7, further comprising:
    after providing at least some of the particular settings to the user device, receiving an instruction from the user device to modify a first setting of the particular settings;
    determining that the user device has already been authorized by physical interaction with the control device; and
    modifying the first setting when the user device has already been authorized by physical interaction with the control device.

12. The method of claim 1, further comprising:
    monitoring an elapsed time from when the second request was received;
    after receiving the second request, receiving a third request from a second user device to modify a second setting of the modifiable settings; and
    ignoring the third request when, at the time that the third request is received, the elapsed time has not exceeded a predetermined time.

13. A control device in a local-area network for authorizing access to the control device, comprising:
    a transceiver for sending and receiving information over the local-area network;
    an interface for a user to physically interact with the control device;
    a memory for storing processor-executable instructions; and
    a processor coupled to the transceiver, the interface and the memory for executing the processor-executable instructions that causes the control device to:
    receive a request from a user device in the local-area network to access modifiable settings of the control device;
    provide the modifiable settings to the user device in response to the request;
    receive a second request from the user device to modify a first setting of the modifiable settings;
    after receiving the second request, determine that a physical interaction with the control device has occurred; and
    modify the first setting in response to determining that the physical interaction has occurred.

14. The control device of claim 13, wherein the control device comprises a router.

15. The control device of claim 13, wherein the control device comprises a home security controller.

16. The control device of claim 13, wherein the processor-executable instructions for determining that a physical interaction with the control device has occurred comprises instructions that causes the control device to:
    determine that a pushbutton has been pressed on the control device.

17. The control device of claim 16, wherein the processor-executable instructions for determining that a physical interaction with the control device has occurred comprises instructions that causes the control device to:
    determine that the pushbutton has been pressed on the control device within a predetermined time from when the second request was received.

18. The control device of claim 13, further comprising additional processor-executable instructions that causes the control device to:
    authorize a user of the user device to access a portion of the control device prior to receiving the second request.

19. A control device in a local-area network for authorizing access to the control device, comprising:
    a transceiver for sending and receiving information over the local-area network;
    an interface for a user to physically interact with the control device;
    a memory for storing processor-executable instructions; and
    a processor coupled to the transceiver, the interface and the memory for executing the processor-executable instructions that causes the control device to:

receive an electronic request from a user device in the local-area network to access particular settings of the control device;

wait to receive an indication of a physical interaction with the control device;

receive the indication of the physical interaction with the control device; and in response to receiving the indication, provide at least some of the particular settings to the user device.

20. The control device of claim 19, wherein the processor-executable instructions for providing at least some of the particular settings to the user device comprises instructions that causes the control device to:

provide the at least some of the particular settings to the user device only when the indication is received within a predetermined time from when the electronic request was received.

21. The control device of claim 19, wherein interface comprises a switch, and the indication comprises an electronic signal generated when a user activates the switch.

22. The control device of claim 19, further comprising additional processor-executable instructions that causes the control device to:

after receiving the electronic request is received, provide a message to the user device for a user of the user device to physically interact with the control device.

23. The control device of claim 19, further comprising additional processor-executable instructions that causes the control device to:

after providing at least some of the particular settings to the user device, receive an instruction from the user device to modify a first setting of the particular settings;

determine that the user device has already been authorized by physical interaction with the control device; and modify the first setting when the user device has already been authorized by physical interaction with the control device.

24. The control device of claim 19, further comprising additional processor-executable instructions that causes the control device to:

monitor an elapsed time from when the request to modify the first setting of the modifiable settings was received;

after receiving the request, receive a second request from a second user device to modify a second setting of the modifiable settings; and ignore the second request when, at the time that the second request was received, the elapsed time has not exceeded a predetermined time.

* * * * *